(No Model.)
LA VERNE W. NOYES.
BOOK HOLDER.
No. 366,680. Patented July 19, 1887.
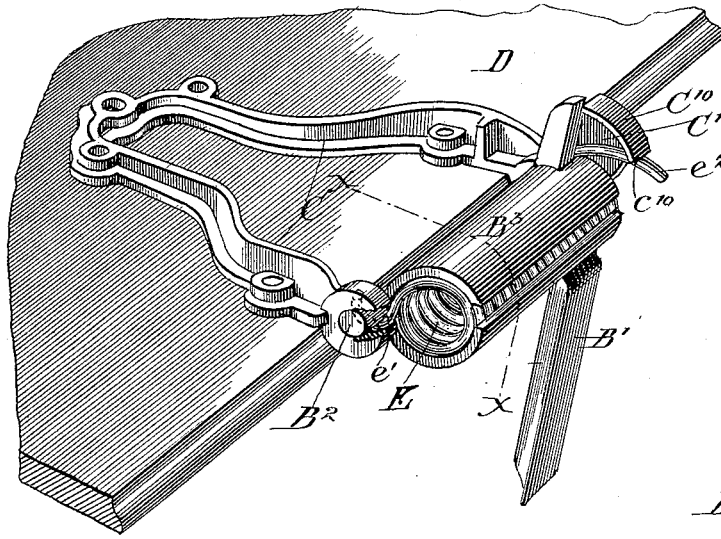
Fig. 1.
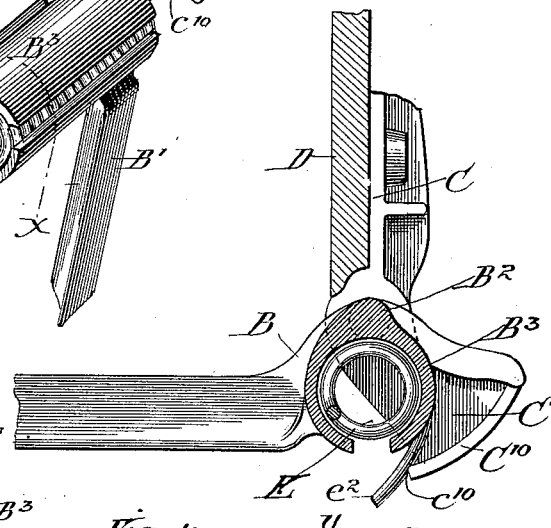
Fig. 2.
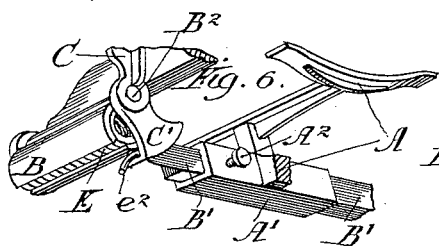
Fig. 6.
Fig. 4.
Fig. 3.
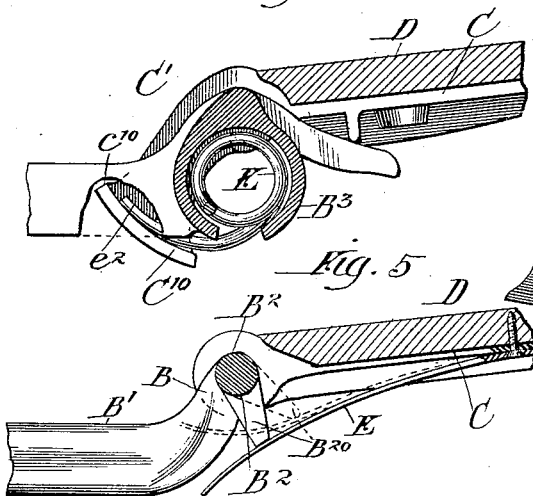
Fig. 5.
Witnesses:
Ira R. Steward.
Frank J. Blanchard
Inventor
LaVerne W. Noyes
By Chas. D. Burton
Attorney

UNITED STATES PATENT OFFICE.

LA VERNE W. NOYES, OF CHICAGO, ILLINOIS.

BOOK-HOLDER.

SPECIFICATION forming part of Letters Patent No. 366,680, dated July 19, 1887.

Application filed January 24, 1887. Serial No. 225,257. (No model.)

*To all whom it may concern:*

Be it known that I, LA VERNE W. NOYES, a citizen of the United States, residing at Chicago, in the county of Cook and State of Illinois, have invented certain new and useful Improvements in Book-Holders, which are fully described in the following specification, reference being had to the accompanying drawings, forming a part thereof.

Figure 1 is a perspective of a portion of the leaf of a book-holder and the plate by which it is pivoted to the support and the spring reacting between them. Fig. 2 is a transverse vertical section made at the plane indicated by the line X X X upon Fig. 1. Fig. 3 is a similar section, but showing the leaf horizontal, as when the book is open. Fig. 4 is a perspective of a modified form of the structure similarly shown in Fig. 1. Fig. 5 is a section at Y Y Y on Fig. 3. Fig. 6 is a reduced perspective view of the book-holder support and the leaves in position thereon.

This invention is an improvement upon a book-holder patented to me May 6, 1886, No. 349,660, and in general the purpose of the improvement is as follows: In said patented device the book-supporting and inclosing leaves, which are pivoted upon supports laterally adjustable, and which rock over their pivots in the process of opening and closing the book, are provided with springs reacting between said leaves and supports, and tending to fold the leaves together—that is, to close the book—and are provided with latches by which they are held open, said latches locking upon the supports, and restraining the action of the springs; but in this improvement I aim to dispense with the latches, and to so connect the springs to the supports and leaves that when the leaves are horizontal—that is, when the book is open—the spring shall act against the leaves radially to their pivots, so that they shall have no tendency to rock the leaves over said pivots, but shall be so connected that after the leaves have been moved away from their horizontal position the pressure of the springs against them respectively shall be transverse to the radii of the pivot, being first obliquely and only slightly transverse, but sufficiently so to move the leaves, and after a slight movement becoming substantially tangential to the curve of motion of the point of contact with the spring. By this means the book is firmly held closed when once closed, but remains passively open when once opened.

A is the central book-support. It is provided with a slide-bearing, A', through which the arms B' of the leaf-supports B slide, being clamped therein at adjusted positions by the screw $A^2$.

C C are the leaf-plates—that is to say, plates to which the leaves D are secured. It will be understood that the leaves D are merely continuations or extensions of the plates C, and that said plates might be extended integrally to perform the same function. The leaf-supports B have the pivots $B^2$, upon which the leaf-plates C are pivoted.

E is a spring, which reacts between the leaf-support and the leaf-plate. In the form shown in Figs. 1, 2, and 3 it is a spiral spring, which is kept in place by the housing $B^3$, which is formed as a part of the leaf-support B, being integral therewith and preferably laterally adjacent to the pivot $B^2$. One end, $e'$, of the said spring is stopped against the leaf-support by being hooked around the pivot $B^2$. The other end is stopped against the flange $C^{10}$, formed upon the projection C' of the leaf-plate C. Said flange, as illustrated, is in the arc of a circle about the axis of the pivot $B^2$; but that precise form is not essential to this action, though it is preferred.

When the leaf is in a vertical position, as shown in Fig. 2, the end $e^2$ of the spring E projects substantially tangentially to the curve of the spiral past the inner edge or corner, $c^{10}$, of the flange $C^{10}$, and the torsional reaction of said spring causes said end to bear outward against said corner $c^{10}$ in a direction approximately parallel to the radius of said spring, but in any event oblique to the flange $C^{10}$. Acting in this direction, the spring has the tendency to hold the leaf vertical, and such will obviously be its tendency until the flange reaches a position with reference to the end of the spring which acts against it such that the pressure of said spring is radial to the pivot $B^2$. When, therefore, the leaf by being forced toward the horizontal position causes the flange $C^{10}$ to force the end $e^2$ of the spring inward, thereby coiling the spring tighter and shortening the curve of said projecting end, the angle between said flange and said projecting end of the spring becomes gradually diminished until, when the leaf has reached the position shown in Fig. 3, the end of the spring has been forced inside the flange $C^{10}$, and, having substantially the same curvature as said flange, the reaction of said spring is directed against the flange at right angles thereto—that is to say, radially to the pivot $B^2$. The spring acting in this direction can have no tendency whatever to rock the leaf over said pivot, but, by reason of the friction which results from pressure of the spring against the flange, it will have a tendency to resist to a slight extent any movement away from that position; but when it is moved therefrom sufficiently to allow the end $e^2$ of the spring again to acquire a direction sufficiently oblique to the flange $C^{10}$, so that the spring may exert a pressure oblique thereto, that pressure will, as before, tend to rock the leaf over the pivot and move it to its vertical position.

It will be obvious that the principle illustrated in the structure hereinabove described may be applied with a spring of a different form and caused to act against the two parts between which it reacts by means of differently shaped and located projections upon said parts. One other such form is illustrated in Figs. 4 and 5, wherein the spring, instead of operating by the torsional reaction, is a flat spring, and has a flexile reaction against a projection, $B^{20}$, on the pivot $B^2$, said pivot being so located that when the leaf is horizontal the spring extending therefrom and resting against the end of the projection reacts against it radially to the pivot of the leaf, as shown in Fig. 5, but when rocked upward very slightly from the horizontal position its pressure is exerted obliquely to the radius of the pivot, and tends to throw the leaf farther upward to the vertical position shown in Fig. 4.

I consider the two forms illustrated in Figs. 1 and 4, respectively, as substantial equivalents, and even if the projection and spring should be so located and shaped then the projection should pass beyond the point where it receives the pressure radially to the pivot and reach a position where the leaf is horizontal, wherein it will receive the pressure in a direction tending to hold the leaf open, as shown by the dotted-line position of the projection in Fig. 5. Still the operation and principle are substantially the same.

I claim—

1. In combination with the leaf-support and the leaf-plate hinged together, a spring secured and stopped on one of said hinged parts and adapted to be coiled and twisted about an axis proximate to that of their hinge, and having an end projecting approximately tangentially to an arc about the axis of torsion, and the other of said hinged parts having a projection which engages the said projecting end of the spring outside the arc to which the same is tangent, and which is moved over and causes coiling of said end by the opening of the leaf, the length and tension of said spring and the position of said projection with relation to the axis of torsion being substantially as shown and described, whereby the reaction of the spring against the projection is substantially radial to the pivot of the hinge by the time the leaf becomes horizontal.

2. In combination, the leaf-support, the leaf-plate pivoted thereto and folding upward, and a spiral spring coiled about an axis proximate to that of the pivot and having one end stopped against the leaf-support, the leaf-plate being provided with a flange forming a stop for the other end of the spring, said end being extended laterally with respect to the pivot to form a foot upon which the flange presses and moves as the leaf rocks, said flange and spring being formed and relatively located substantially as described, whereby the pressure of the spring upon the flange at the point at which said spring bears upon it when the leaf is horizontal is substantially radial to the pivot of the leaf-plate, as and for the purpose set forth.

3. In combination, the book-support, the leaf-supports, and the leaf-plates, the leaf-plates being pivoted, respectively, to the leaf-supports and provided each with a spring reacting between said parts and secured to one of them, the other being provided with a projection which receives the pressure of the spring and moves against it as the leaf rocks, said projection and spring being formed and located substantially as described, whereby the pressure of the spring upon the projection becomes substantially radial to the pivot of the leaf-plate by the time the leaf is unfolded, each leaf-support with its leaf-plate and operating-spring being independent of the other and independently adjustable laterally with respect to the book-support, substantially as set forth.

In testimony whereof I have hereunto set my hand, in the presence of two witnesses, at Chicago, Illinois, this 11th day of January, A. D. 1887.

LA VERNE W. NOYES.

Attest:
 CHAS. S. BURTON,
 FRANCIS W. PARKER.